March 17, 1953 — F. M. LE COMPTE ET AL — 2,631,680
ARTICULATED BLADE
Filed May 29, 1950
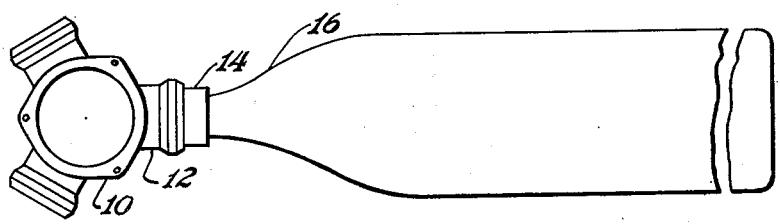
FIG. I
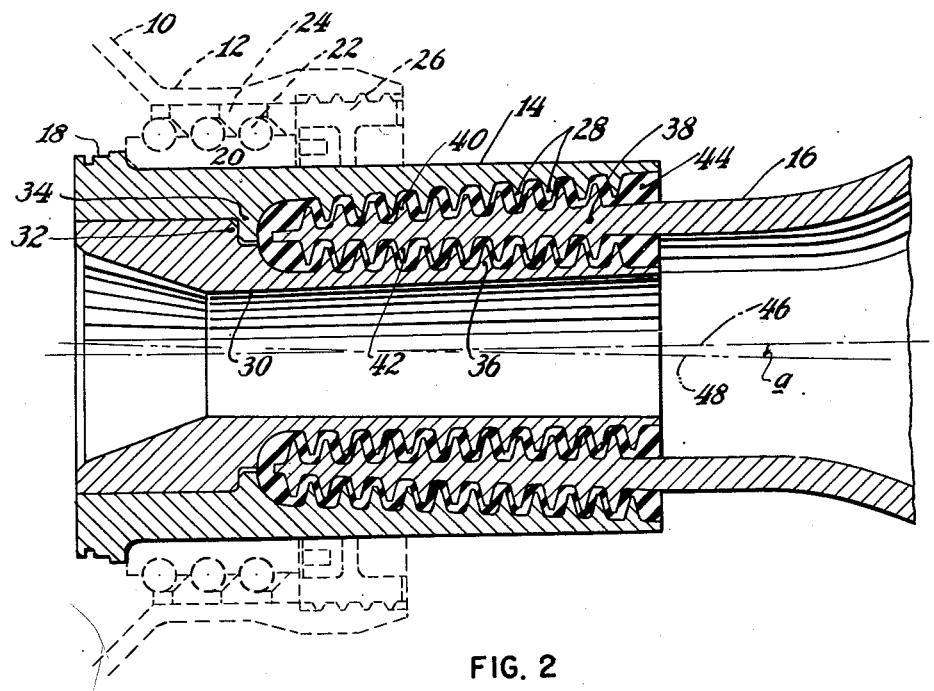
FIG. 2
INVENTORS
FRANK M. LE COMPTE AND
EDWARD S. BUCHER
BY Godfrey B. Speir
ATTORNEY Patented Mar. 17, 1953

2,631,680

UNITED STATES PATENT OFFICE 2,631,680

ARTICULATED BLADE

Frank M. Le Compte, Chatham, and Edward S. Bucher, Montclair, N. J., assignors to Curtiss-Wright Corporation, a corporation of Delaware Application May 29, 1950, Serial No. 165,072

5 Claims. (Cl. 170—160.53)

This invention relates to aeronautical propellers, and is concerned particularly with improvements in propeller blades and mounting thereof to reduce blade operating stress.

In large propellers for large aircraft power plants, propeller blades are subject to high stress in operation, such stress, largely vibratory in character, resulting from aerodynamic and engine induced forces which place high bending moments upon the propeller blades. For purposes of simplicity and lightness, large propeller blades are ordinarily more or less rigid structurally but of course deflect under operating loads, such deflections inducing the above mentioned high stress. There have been various proposals in the art to articulate propeller blades to minimize or eliminate bending moments in the shank portions of the blades but these articulation proposals are found wanting from a practical standpoint since they introduce weight increases and structural complexities to the point where their disadvantages usually outweight their advantages. Some of these proposals have included an articulating connection between a propeller blade and its hub, others having contemplated the elastic mounting of an entire propeller on its shaft, and a few have suggested the articulation of different portions of a blade with respect to each other. None of the prior proposals, so far as applicants are aware, provide sufficient net advantage to be usable in large aircraft.

Our invention provides a composite propeller blade construction where universal limited articulation is provided in the blade proper so that no modifications are necessary in a propeller hub structure, in the mounting of the blade in the hub, or in the pitch changing mechanism usually contained within the hub and connected to a portion of the propeller blade. Our invention provides an elastic joint near the butt end of the propeller blade between that part of the blade which is secured in the hub and the outer portion of the blade which carries the airfoil enabling relative swinging of these parts in any direction. This joint contains rubber or other flexible material and the organization of the structure is such that the rubber is effectively applied to permit of limited articulation of the blade components relative to each other and yet, to provide a structurally adequate joint to prevent possibilities of failure. While the rubber joint is not completely free to the point where it would wholly eliminate transmission of bending moments in the propeller blade, it is characterized by sufficient softness so that decoupling of the elements of the propeller blade is afforded, to the end that resonance between the several components of the propeller may be eliminated with a consequent reduction of vibrative stress in the components of the assembly.

The invention is capable of adaptation in a number of different forms but a preferred form has been selected for illustration in the attached drawings which are not intended to be limiting insofar as the scope of the invention is concerned.

In the drawings, Fig. 1 is an end view of a propeller hub with a blade mounted therein in accordance with the teachings of the invention; and Fig. 2 is an enlarged longitudinal section through the butt end of a propeller blade showing a construction of the articulating joint of the invention.

Referring briefly to Fig. 1, 10 represents a propeller hub of known characteristics having a plurality of blade sockets 12 protruding therefrom, the hub including appropriate pitch changing mechanism which is well known in the art. Within each socket 12, a propeller blade sleeve 14 is mounted and from the sleeve, a blade 16 extends. Referring now to Fig. 2, the sleeve 14 resembles the inner end of a conventional propeller blade and includes the flange 18 engaging an inner bearing race 20 which embraces the sleeve 14. The race 20 is in contact with bearing balls 22 engaged by outer race components 24 secured in the blade socket 12 as by a nut 26. This bearing construction is well known in the art. Suitable provisions are made in connection with the flange 18 to adjust the sleeve for blade pitch adjustment of the entire propeller blade in any suitable manner. Examples of a propeller blade mounting of this type and of pitch changing mechanism are shown in Chillson application Serial No. 675,383 filed June 8, 1946, and in Patents Nos. 2,460,910 and 2,499,837.

The sleeve 14 is provided with more or less annular internal ribs 28, the ribs being relatively high and thin and there being a substantial axial spacing between the ribs. These ribs can be annular but we prefer to make them in the form of a continuous helix like a screw thread, for a purpose which will become apparent. Within the sleeve 14 is a secondary sleeve 30 provided with an abutment 32 engaging an abutment 34 formed in the inside of the sleeve 14, these abutments limiting the outward or rightward movement of the secondary sleeve 30 with respect to the sleeve 14. On an outer portion of the secondary sleeve 30 are formed a plurality of relatively high, thin, substantially annular ribs 36 which, like the ribs 28, are preferably in the form of a helical screw thread. Between the sleeves 14 and 30 and between the ribs 28 and 36 a substantial cavity is formed which is occupied in part by the shank portion 38 of the propeller blade 16. The shank portion 38 is formed with external substantially annular ribs 40 and internal substantially annular ribs 42, the ribs having the same general form as the previously described sleeve ribs and also, preferably, being in the form of continuous helices, like screw threads. The outside diameter of the ribs 40 is greater than the nside diameter of the ribs 28 and likewise the inside diameter of the ribs 42 is less than the outside diameter of the ribs 36, in order that the shank of the propeller blade will be interlocked with the sleeves 14 and 30 against outward displacement under the influence of centrifugal force and to provide abutments against which the filler within the sleeve cavity may bear. As is clear in the drawings, there is substantial clearance relationship between the elements of the shank 16 and the elements of the sleeves 14 and 30, and this clearance space is filled with rubber of appropriate character. When the term "rubber" is mentioned, it is intended to connote either natural or synthetic rubber of any appropriate composition and physical characteristics. The rubber, indicated at 44, provides an isolation of the shank from the sleeves, holding them from metallic contact with one another and providing a resilient cushion therebetween.

When the propeller blade assembly is being made, the helical ribs on the shank 16 are screwed into the helical ribs on the sleeves 14 and 30, after which the shank and sleeves are held concentric in suitable fixtures with the spacing between the various ribs held to close tolerances. Thereupon, using suitable injection equipment, the rubber 44 is injected into the clearance space between the sleeve elements and the shank elements after which the rubber is subjected to appropriate curing processes. When thus completed, the blade and sleeve elements become a unitary assembly and, since the injection and curing processes include the firm bonding of the rubber material 44 to all metal surfaces with which the rubber comes in contact, a firm joint is afforded between the blade proper and the sleeve elements. The dimensional characteristics of the sleeves and shank and of their ribs are designed to assume, safely, the stress to which the blade will be subjected in service. To this end, the inner end of the shank 38 of the blade may be tapered as shown and the outer ends of the sleeves may likewise be tapered to provide efficient and economical stress distribution. It may be noted that the shank ribs are displaced leftwardly with respect to the sleeve ribs. This represents the centrifugally unloaded condition of the propeller blade whereby there will be a greater mass of rubber on the right hand sides of each shank rib and a lesser mass of rubber on the left hand side of each shank rib. When the blade is subjected to centrifugal force it tends to pull outwardly (to the right) relative to the sleeves, thus compressing the rubber 44 and substantially centralizing the shank ribs 40 and 42 in the spaces between the sleeve ribs 28 and 36.

The propeller blade and sleeve components are shown concentric with one another both having the common axis 46. In operation, due to bending moments and forces imposed upon the propeller blade, there is a tendency for the blade axis to depart from axis 46 to an axis such as 48, the two axes making an angle $a$ with one another. This deflection of the blade axis relative to the sleeve axis is permitted through the elasticity of the rubber 44 in the blade assembly so that the blade may articulate with comparatively restraint whereby transmission of bending moments from the blade to the hub is greatly moderated. This decoupling of the transmission of forces from one of the blade elements to the other serves the purpose of substantially reducing the stress in the blade shank, in the blade hub and also in the blade proper. As pointed out heretofore, the rubber mounting does not give entire freedom for articulation of the propeller blade since it does afford restraint between the blade elements. But the rubber characteristics may be so chosen as to afford the above mentioned stress reduction in propeller blade operation.

It will be noted that the configuration shown in Fig. 2 affords a very large surface area for rubber contacts in the blade joint whereby the unit stress in the rubber and in the bonding of the rubber to the metal components will be well within tolerable limits. If blade loading is comparatively light, a portion of this structure could be eliminated. For instance, either of the ribs 28 and 40, or the ribs 36 and 42 could be eliminated to reduce weight. If on the other hand, the stress conditions in the blade mounting were very large, additional sets of ribs could be provided in the shank and sleeve members of the blade assembly to provide adequate strength in the joints. Also, strength can be adjusted in the joint by shortening or lengthening the rib portions of the blade and sleeves. Preferably, the length of the rib joint is held to a minimum consistent with strength to allow greater articulating freedom of the blade with respect to the sleeves. If the rib joint is made unduly long, the resistance to articulation of the blade becomes greater and can become sufficiently great so as not to afford the required degree of decoupling between the blade and its mounting.

In general, the rubber in the blade joint is under compression and will tend to flow from compressively loaded zones into zones which are not so loaded. The strength of the joint may further be adjustable by modification of the clearance between the tips of the various ribs and the bottoms of the inter-rib spaces on the alternate member. Some clearance at these points is necessary to permit articulation.

Either annularly ribbed or helical joints of the type disclosed, where the principal stress is axial of the propeller blade, will afford adequate torsional rigidity between the blade and its mounting, whereby pitch adjustments of the propeller blade will deviate in insignificant degree from pitch adjustments applied to the mounting sleeve 14.

It will be clear that provisions of this invention are applicable to virtually any type of propeller blade embodied in a controllable pitch propeller and likewise, the principles can be applied to fixed pitch propellers with equal facility. The location of the rubber joint between the shank and blade components is susceptible to design modification so that it may be placed either close to or relatively remote from the propeller center of rotation, as design requirements may dictate.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. A unitary propeller blade comprising a pair of concentric sleeves, the outer sleeve having a hub engaging portion and internal threads, the inner sleeve having external threads in spaced relation to the internal threads, said threads having the same lead, a propeller blade having an internally and externally threaded shank, said shank being screwed into said sleeves so that the external shank threads interengage with the internal sleeve threads and the internal shank threads interengage with the external sleeve threads, said interengaging threads all being in spaced relation, and rubber-like material in the inter-thread spaces to enable elastic articulation of said shank relative to said sleeves.

2. A propeller blade according to claim 1 in which the inner and outer sleeves taper in thickness from relatively thick portions adjacent the hub engaging portion to relatively thin portions remote from the hub engaging portion, and in which the propeller blade shank is tapered in thickness from a thin portion at its inner end to a relatively thicker portion at its outer end.

3. A unitary propeller blade comprising a blade butt member for mounting in a hub socket having an axially extending annular recess let into its outer end, the width of the recess annulus being relatively great at the member outer end and relatively small toward the member inner end, a blade having a cylindrical hollow shank tapered for fitting engagement in clearance relation within the recess of said butt member, elastic means between the outer walls of the shank and recess, and elastic means between the inner walls of the shank and recess.

4. A unitary propeller blade comprising a blade butt member for mounting in a hub socket and having an annular recess in its outer end, the recess defining an inwardly facing wall and an outwardly facing wall, a blade having a hollow cylindrical shank disposed in said recess, the inner and outer walls of the shank respectively facing the outwardly and inwardly facing walls of the butt recess and having clearance relation therewith, and elastic means in the clearances between the recess walls and shank walls for securing said shank to said butt member.

5. A unitary propeller blade comprising a blade butt member for mounting in a hub socket and having an annular recess in its outer end, the recess defining an inwardly facing wall and an outwardly facing wall, a blade having a hollow cylindrical shank disposed in said recess, the inner and outer walls of the shank respectively facing the outwardly and inwardly facing walls of the butt recess and having clearance relation therewith, and elastic means in the clearances between the recess walls and shank walls for securing said shank to said butt member, said shank walls and recess walls having protrusions integral therewith to increase the surface area thereof in contact with said elastic means.

FRANK M. LE COMPTE.
EDWARD S. BUCHER.

REFERENCES CITED

The following references are of record in the file of this patent:

UNITED STATES PATENTS

| Number | Name | Date |
|---|---|---|
| 1,400,033 | Dickey | Dec. 13, 1921 |
| 1,870,361 | Hamilton | Aug. 9, 1932 |
| 2,235,605 | Bugatti | Mar. 18, 1941 |
| 2,245,251 | Chilton | June 10, 1941 |
| 2,297,142 | German | Sept. 29, 1942 |
| 2,471,578 | Moore | May 31, 1949 |

FOREIGN PATENTS

| Number | Country | Date |
|---|---|---|
| 807,288 | France | Oct. 12, 1936 |